United States Patent [19]
Kazaoka et al.

[11] Patent Number: 4,671,569
[45] Date of Patent: Jun. 9, 1987

[54] RESILIENT BACK-UP MECHANISM FOR VEHICLE SEAT STRUCTURE

[75] Inventors: Kenichi Kazaoka, Nagoya; Hiroshi Okazaki, Kariya, both of Japan

[73] Assignee: Aisin Seiki Kabushiki Kaisha, Kariya, Japan

[21] Appl. No.: 776,951

[22] Filed: Sep. 17, 1985

[30] Foreign Application Priority Data

Sep. 18, 1984 [JP] Japan ................................. 59-194022
Sep. 18, 1984 [JP] Japan ................................. 59-194023

[51] Int. Cl.4 ................................................ A47C 7/46
[52] U.S. Cl. ..................................... 297/284; 267/89; 267/177
[58] Field of Search ................. 297/284, 452; 267/89, 267/110, 112, 175, 177

[56] References Cited
U.S. PATENT DOCUMENTS 4,019,777 4/1977 Hayashi ............................... 297/284
4,148,522 4/1979 Sakurada et al. ................... 297/284
4,159,847 7/1979 Arai .................................... 297/284
4,162,807 7/1979 Yoshimura .......................... 297/284

Primary Examiner—Kenneth L. Dorner
Assistant Examiner—Peter R. Brown
Attorney, Agent, or Firm—Finnegan, Henderson, Farabow, Garrett & Dunner

[57] ABSTRACT

A resilient back-up mechanism for a seat back structure of a vehicle seat for supporting a waist portion of a passenger sitting on the seat. An adjusting member is mounted on a seat back frame for pivotal movement and back-up means is also pivotably mounted on the seat back frame. An adjustable spring having one end engaged with the adjusting member and the other end engaged with the back-up means applies a resilient support to the back-up means against rearward movement. The amount of resilient support may be adjusted by swingably moving the adjusting member by an actuating means.

9 Claims, 12 Drawing Figures

RESILIENT BACK-UP MECHANISM FOR VEHICLE SEAT STRUCTURE

BACKGROUND OF THE INVENTION

1. Field of the Invention

The present invention relates to a resilient back-up mechanism for a vehicle seat structure. More particularly, the present invention pertains to an adjustable resilient back-up mechanism for supporting the waist portion of a passenger sitting on the seat.

2. Description of the Related Art

There are several types of structures for making the resilient back-up mechanisms for vehicle seats adjustable. The known types include a direct drive system as shown by the Japanese Patent Publication No. 56-10051, a cam drive type as disclosed by the Japanese Patent Publication No. 55-49 and a screw drive type as disclosed by the Japanese utility model publication 51-20802. The direct drive is of a mechanism having a back-up member located at a portion corresponding to the waist portion of the passenger sitting on the seat. An actuating lever is provided for moving the back-up member to thereby adjust the back-up force. This mechanism is however disadvantageous in that a large actuating force is required when the adjustment is carried out while the passenger's weight is applied on the seat back. Further, the mechanism is disadvantageous in that a complicated ratchet mechanism must be provided for holding the parts of the mechanism in desired positions. The ratchet mechanism is mounted on the seat back frame. However, it is a troublesome work to install the ratchet mechanism during a seat assembling process.

The cam drive type has a cam which is actuated by an actuating lever to thereby adjust the position of the back-up member. This type is also disadvantageous in that a large actuating force is required when an adjustment is made while the weight of the passenger is applied on the seat back. Another disadvantage of this type is that a preassembled adjusting mechanism is mounted by means of bolts on brackets which are provided on the seat back frame, so that the mounting procedure is very troublesome.

The screw drive type includes a screw-nut mechanism for converting a rotation of a handle member to an axial movement. This mechanism is inconvenient to use because a lot of rotation is required to obtain a desired adjustment. If a coarse thread is adapted to increase the adjusting speed, an increased operating force will be required.

SUMMARY OF THE INVENTION

It is therefore an object of the present invention to provide an adjusting mechanism for a resilient back-up mechanism in a vehicle seat back, which is easy and convenient to operate.

Another object of the present invention is to provide an adjusting mechanism for a resilient back-up device in a vehicle seat back which is easy to mount on a seat back frame.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

According to the present invention, the above and other objects can be accomplished, in a vehicle seat including a seat back frame, by a back-up mechanism including an adjusting member mounted on the seat back frame for a swingable movement, a waist back-up member supported by the seat back frame for fore and aft movement, an adjustable spring between the adjusting member and the waist back-up member to provide a resilient support for the back-up member against a movement in a rearward direction. The spring is arranged so that its axis lies on a line spaced apart from the pivot support of the back-up member on the seat back frame so that a moment is produced by the spring force for resisting a rearward movement of the back-up member, and that a swinging movement of the adjusting member causes a change in the distance between the axis of the adjusting spring and the pivot support of the back-up member whereby the resilient back-up force of the back-up member can be changed. The distance between the axis of the adjusting spring and the pivot support of the back-up member may be changed together with the axial elongation of the spring.

In a case where a pair of adjusting members are provided on opposite side portions of the seat back frame, respectively, they may be connected together by a connecting rod. For mounting the adjusting members on the seat back frame, brackets may be provided. One of the brackets may have a hole for receiving a pin on one of the adjusting members and the other bracket may have a one-end open slot which is engaged with a pin on the other of the adjusting members. With this arrangement, it becomes very easy to assemble the adjusting mechanism on the seat back frame. In a case where the back-up member is mounted on a rod which is rotatably supported at the opposite ends by the opposite side portions of the seat back frame, one end of the rod may be carried in a hole and the other end may be carried in a one-end open slot.

The above and other objects and features of the present invention will become apparent from the following descriptions of preferred embodiments taking reference to the accompanying drawings.

The accompanying drawings which are incorporated and constitute a part of this specification, illustrate presently preferred embodiments of the invention and, together with the description, serve to explain the principles of the invention.

BRIEF DESCRIPTIONS OF THE DRAWINGS

Reference will now be made in detail to several embodiments of the invention, examples of which are illustrated in the accompanying drawings. Throughout the drawings, like reference characters are used to designate like elements.

DESCRIPTIONS OF THE PREFERRED EMBODIMENTS

Figure 1:
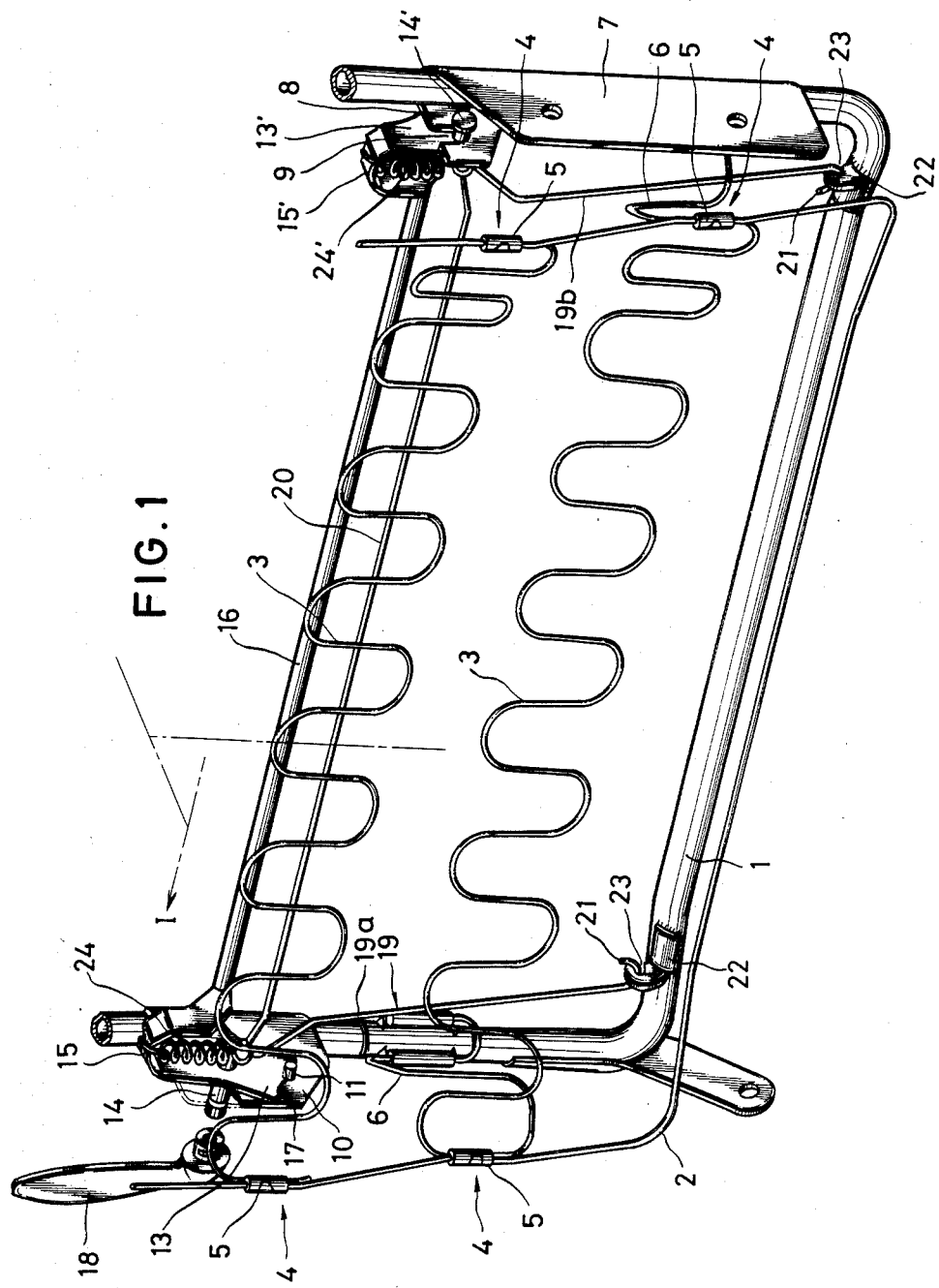
FIG. 1 is a perspective view of a back-up mechanism for a vehicle seat back structure in accordance with one embodiment of the present invention.
Figure 2:
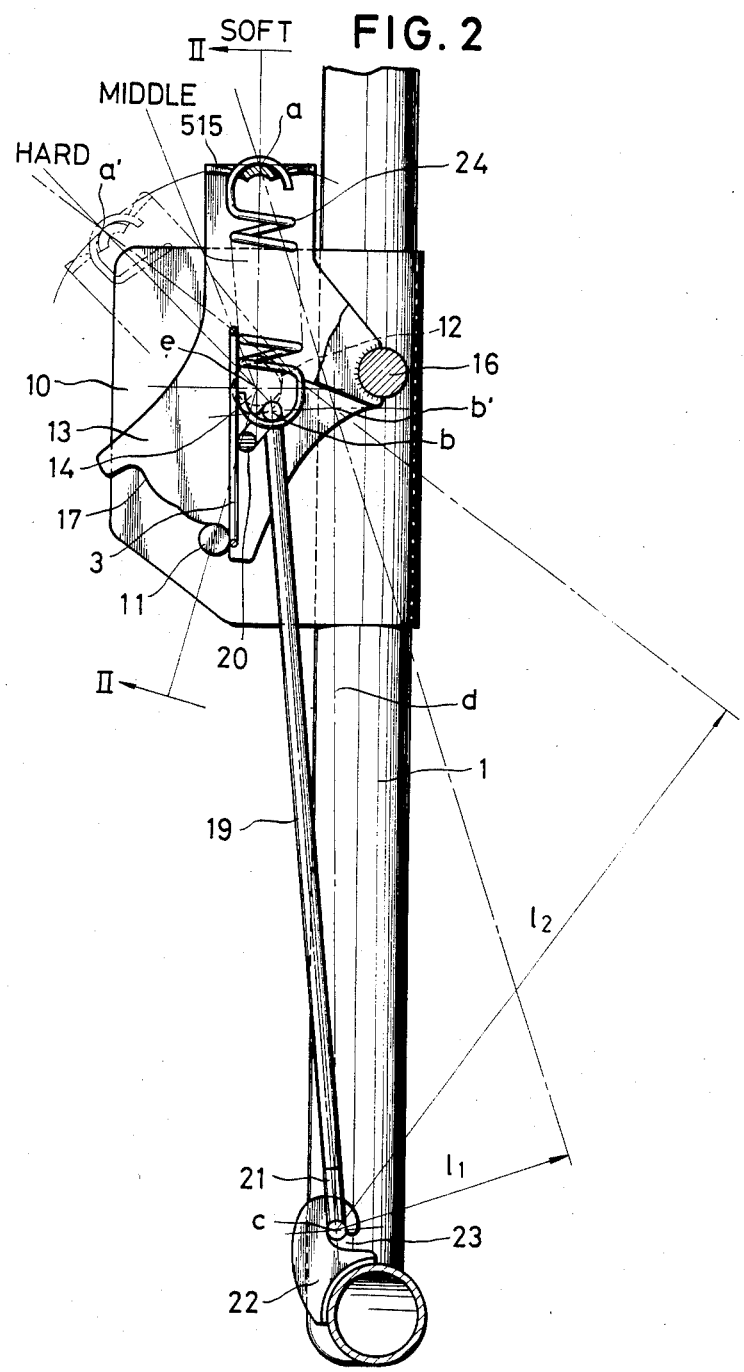
FIG. 2 is a view as seen in the direction of the arrow I in FIG. 1.
Figure 3:
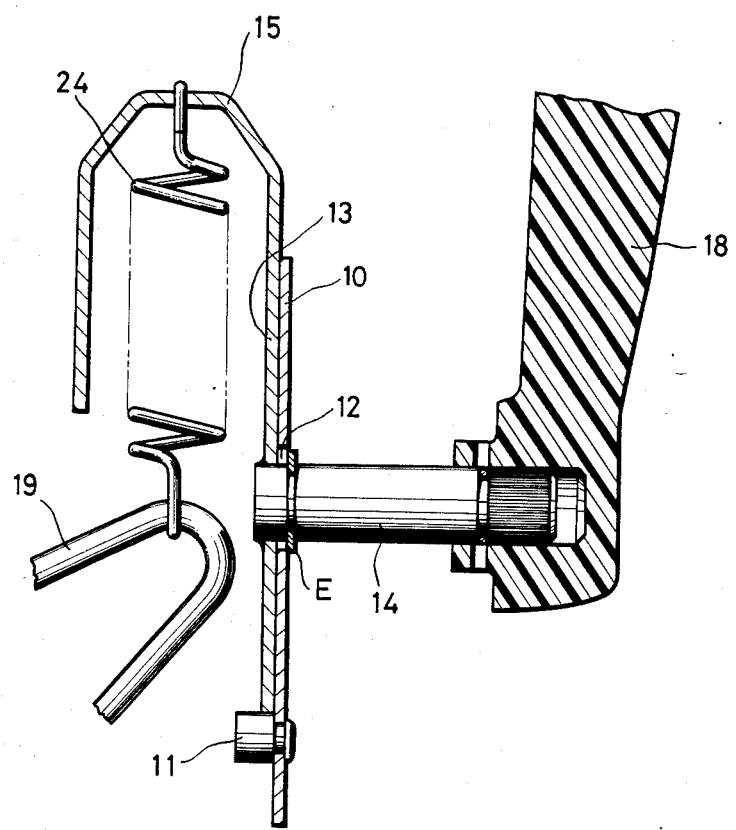
FIG. 3 is a sectional view taken along the line II—II in FIG. 2.
Figure 4:
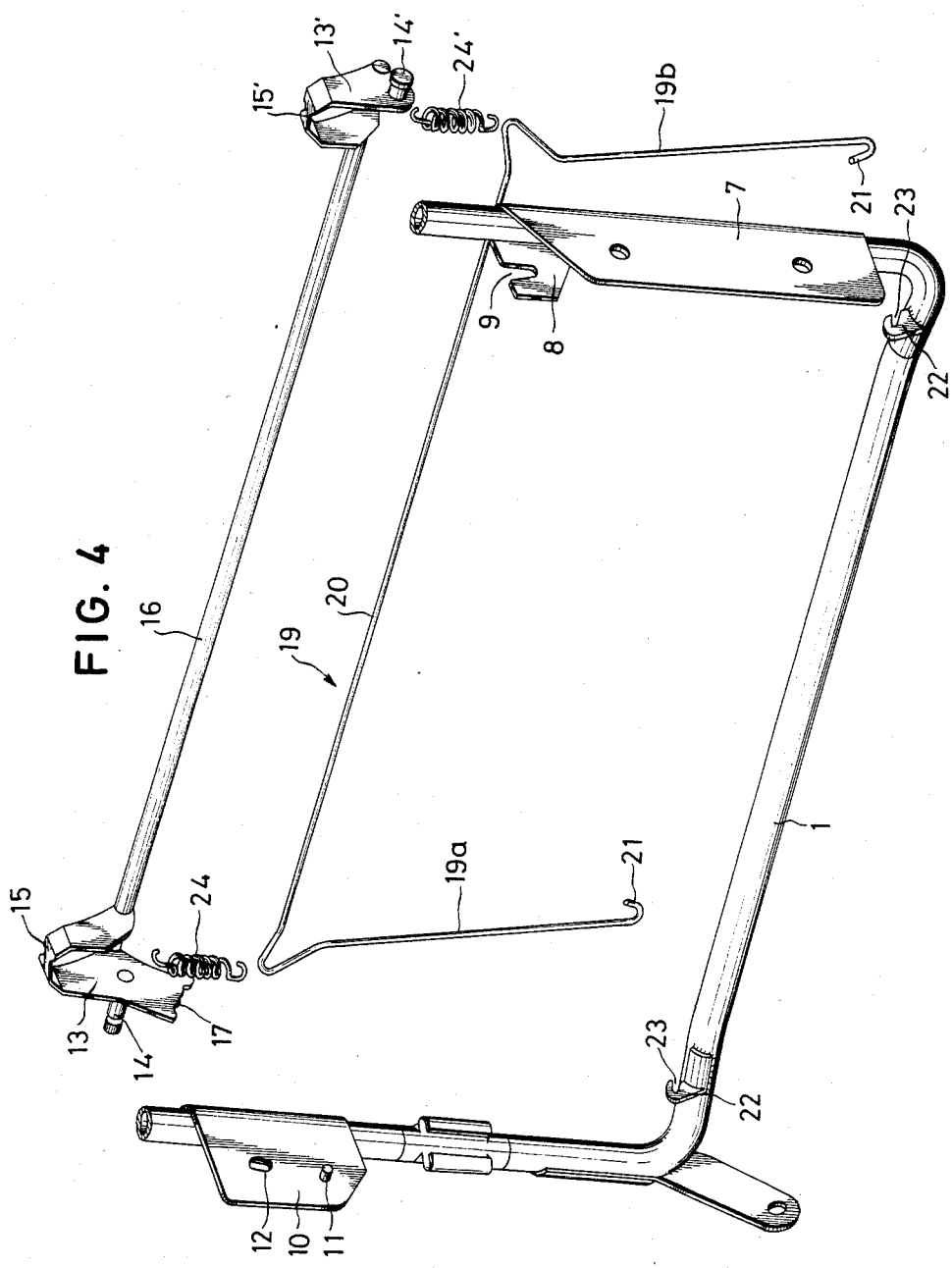
FIG. 4 is an exploded perspective view of the mechanism shown in FIG. 1.

Referring to FIG. 1, particularly to FIGS. 1 through 4, there is shown one embodiment of the present invention which includes a seat back frame 1 made of a pipe member of a substantially U-shaped configuration. In front of the seat back frame 1, there is a contour wire 2 which functions to maintain the shape of the seat cloth. Between the opposite sides of the wire 2, there extend wave-shaped seat springs 3. In FIG. 3, it will be understood that the lower-most seat spring 3 is held at the opposite end portions on the side portions of the contour wire 2 by means of clips 5. Each end 6 of the spring 3 extends through the clip 5 and secured to the side portions of the seat back frame 1. The seat back frame 1 is attached at one of its side portions with a backet 7 which is welded thereto for the purpose of mounting a seat reclining mechanism (not shown). At the upper portion, the bracket 7 is of a substantially U-shaped cross-section having an inner flange 8 which is formed with a U-shaped slot 9. At the other side portion, the seat back frame 1 is attached with a second bracket 10 which is welded thereto. The bracket 10 has a pin 11 at its lower portion and is formed at an intermediate portion with a slot 12 as best shown in FIG. 4.

At the opposite sides, there are respectively provided adjusting members 13 and 13' which carry pins 14 and 14', respectively. The adjusting member 13 is at the side where the bracket 10 is provided and the pin 14 on the adjusting member 13 is engaged with the slot 12 in the bracket 10. The adjusting member 13' is adjacent to the bracket 7 and the pin 14' on the member 13' is engaged with the slot 9 in the inner flange 8 of the bracket 7. The adjusting members 13 and 13' are respectively formed at the upper portions with arms 15 and 15' of inverted U-shaped configurations. The ends of the arms 15 and 15' are connected with a connecting rod 16. The adjusting member 13 is formed with teeth 17 which is adapted for engagement with the pin 11 on the bracket 10. An operating handle member 18 is attached to the pin 14.

As shown in FIG. 4, there is provided a depressing spring member 19 having a substantially horizontal upper portion 20 and vertical portions 19a and 19b extending downwardly from the opposite ends of the horizontal portion. As shown in FIG. 1, the horizontal portion 20 of the depressing spring member 19 is positioned behind one of the seat springs 3. The vertical portions 19a and 19b of the spring member 19 are formed with hooked portions 21 which are engaged with slots 23 in brackets 22 welded to the lower portion of the seat back frame 1. A tension spring 24 is provided to extend between the adjusting member 13 and the corner portion between the horizontal portion 20 and the vertical portion 19a of the spring member 19. A second tension spring 24 is provided to extend between the adjusting member 13' and the corner portion between the horizontal portion 20 and the vertical portion 19b of the depressing spring member 19.

In FIGS. 1 through 3, the parts are shown in "soft" positions. In FIG. 2, it will be noted that the axis of the tension spring 24 passing through points a and b also passes through the fulcrum point c of the depressing spring member 19 so that the depressing spring member 19 does not receive any force urging it toward the seat spring 3. In this position, if a passenger sits on the seat and applies his weight on the seat back, there will be produced a deflection in the seat spring 3 whereby the depressing spring member 19 is forced to incline rearward to, for example, a position shown by a phantom line d in FIG. 2. The axis of the spring 24 is then inclined to a line passing through the points a and b' applying the spring member 19 with a counter-clockwise moment with a moment arm l1. It will be noted that in this position the deflection of the spring 24 is relatively small and the moment arm l1 is also small. Therefore, the support force produced by the spring mechanism is relatively weak.

When it is desired to obtain a "hard" support when a passenger is applying his weight against the seat back as discussed above, the pin 14 is rotated by the handle member counter-clockwise to thereby rotate the adjusting members 13 and 13'. The point a where the upper end of the spring 24 is engaged with the adjusting member 13 is therefore moved counter-clockwise to the point a' so that an increased moment arm l2 is obtained. It will be noted further in FIG. 2 that the deflection of the spring 24 is increased. Thus, an increased spring support force can be obtained.

It will be understood that in the example of the mechanism described above, the operating effort can be very small and can be substantially the same both in cases where the adjustment is made from the "soft" to the "hard" and from the "hard" to the "soft". When the operating handle is rotated counter-clockwise while the spring member 19 is deflected to the phantom line d discussed above as seen in FIG. 2 to move from the "soft" position to the "hard" position, the spring 24 is expanded to increase the spring force. However, when the axis of the spring 24 moves from the line ab' to the line a'b', the axis of the spring 24 moves toward the axis of the pin 14. Therefore, there will be no increase in the moment produced by the force of the spring 24 about the axis of the pin 24 to resist the actuation of the operating handle 18.

In assembling the structure described above to the seat back frame 1, the adjusting members 13 and 13' connected together by the connecting rod 16 as shown in FIG. 4 are put into position by having the pin 14 on the member 13 inserted into the slot 12 in the bracket 10 and then having the pin 14' on the member 13' engaged with the slot 9 in the bracket 8. Then a circlip E is fitted to the pin 14 to hold the pin 14 from moving in the axial direction as shown in FIG. 3. Thereafter, the back-up spring 19 is installed in position by having the hook portions 21 engaged with the slots 23 in the brackets 22 and springs 24 and 24' are then installed between the arms 15 and 15' of the adjusting members 13 and 13' and the corner portions of the spring 19. It will therefore be understood that the assembling procedure is very simple.

As an alternative assembling procedure, the adjusting springs 24 and 24' are in advance connected to the adjusting members 13 and 13' and the corner portions of the back-up spring 19 before the hook portions 21 of the spring 19 are engaged with the slots 23 in the brackets 22. In lieu of fitting the circlip E to the pin 14, the pin 14' may be formed with an end flange so that the pin 14' can be fitted to the bracket 8 without any noticeable axial play.

Figure 5:
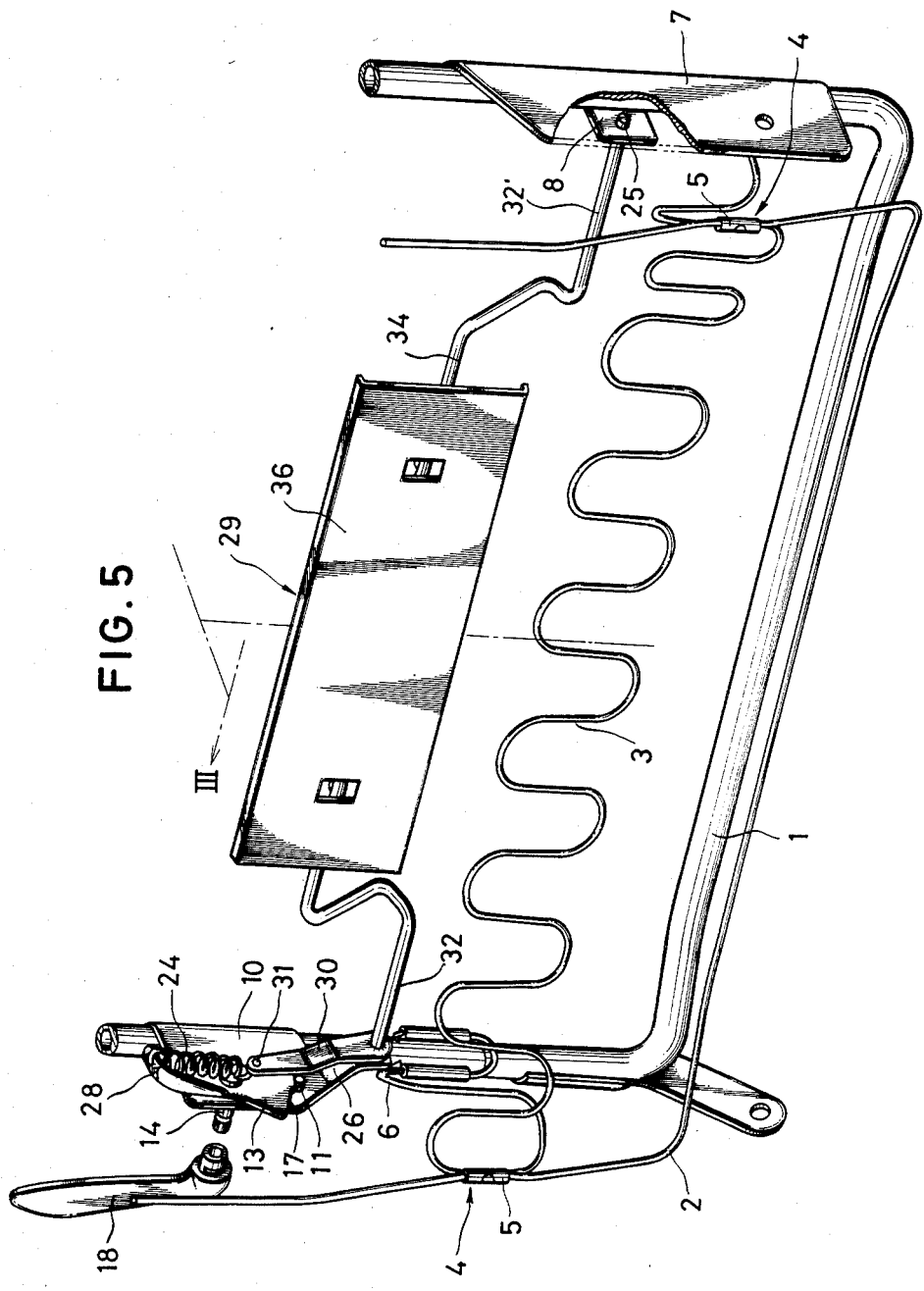
FIG. 5 is a perspective view similar to FIG. 1 but showing another embodiment.
Figure 6:
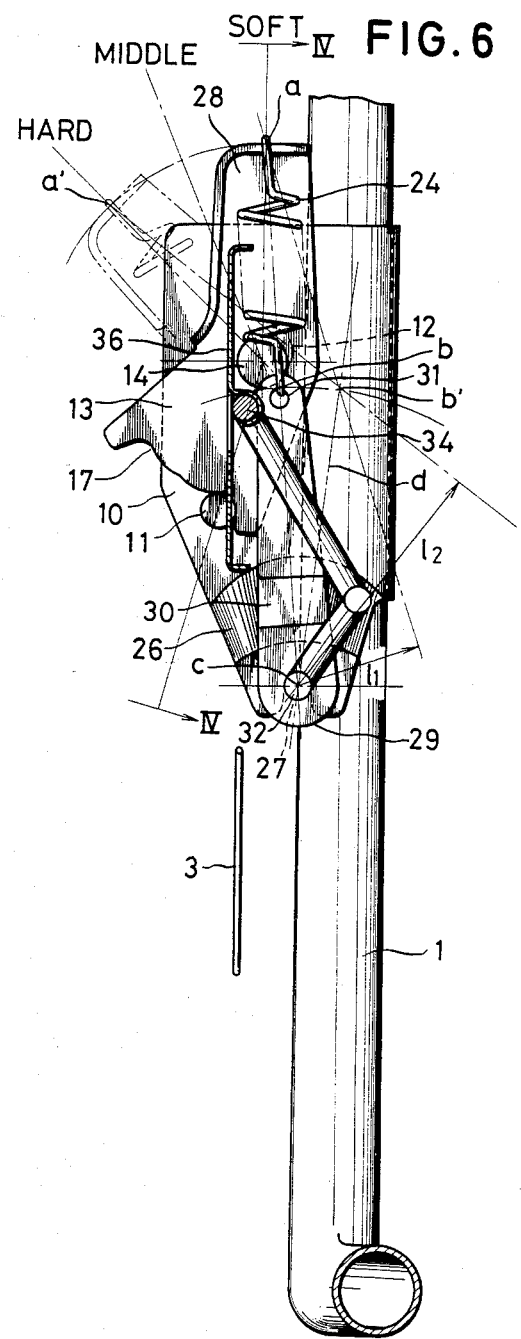
FIG. 6 is a view as seen in the direction of the arrow III in FIG. 5.
Figure 7:
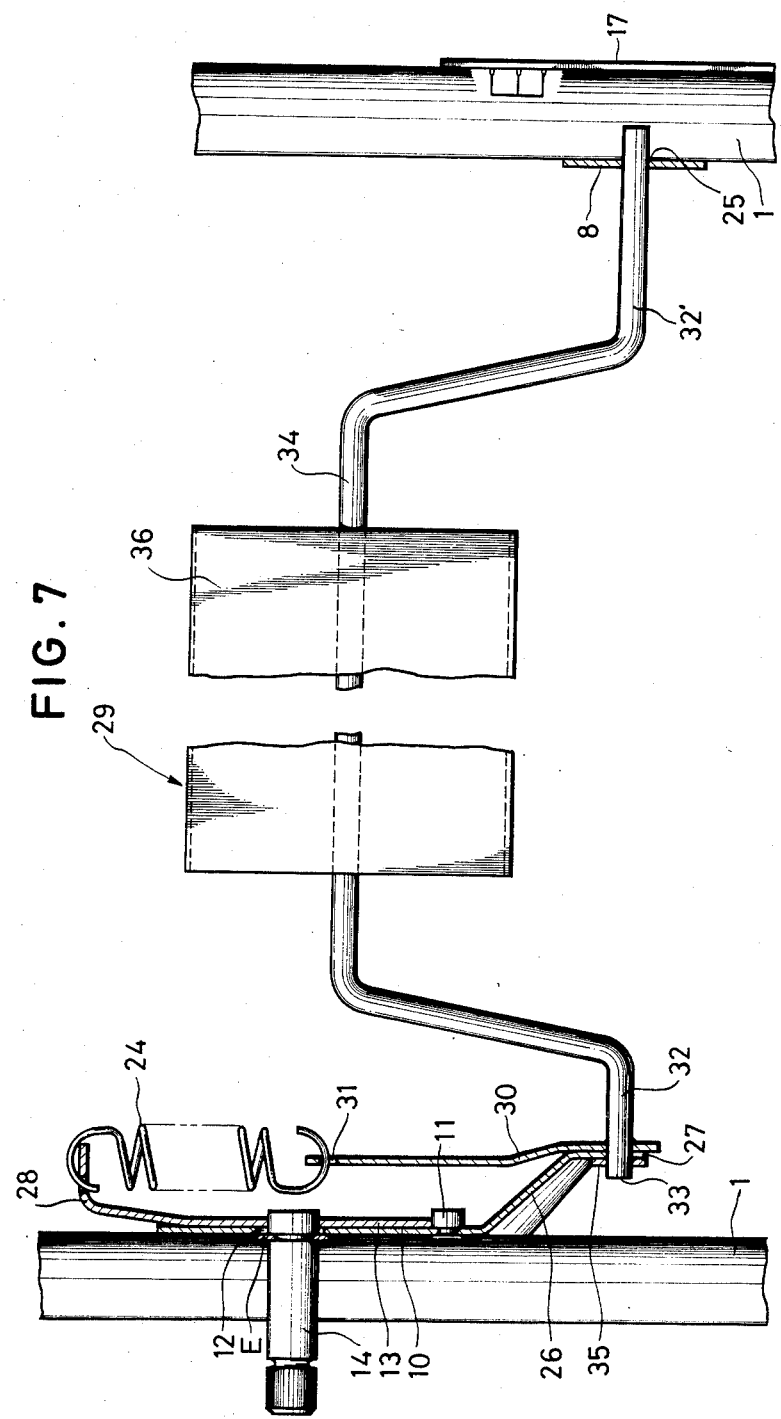
FIG. 7 is a sectional view taken along the line IV—IV in FIG. 6.

Referring now to FIGS. 5, 6, 7 and 8 showing another example of the present invention, the structure shown therein is different from the previous embodiment in that the adjusting spring 24 is provided only one side and a waist back-up plate 36 is provided. In FIG. 5, it will be noted that the bracket 7 secured to one side portion of the seat back frame 1 is formed with an inner flange 8 having a hole 25. The bracket 10 secured to the other side portion of the seat back frame 1 has a downwardly extending portion 26 which is formed with a downwardly opening slot 27 as shown in FIG. 6. The adjusting member 13 is provided only at the side where the bracket 10 is located so that the connecting rod 16 as used in the previous embodiment is omitted. Thus, the bracket 10 in this embodiment is not of an inverted U-shape as in the previous embodiment but is formed at the upper end with an inwardly extending flange 28. There is provided a back-up mechanism 29 which includes the aforementioned back-up plate 36 and a crank rod having a central portion 34 and end portions 32 and 32'. The central portion 34 of the crank rod is secured by, for example, welding to the back-up plate. The end portion 32 of the crank rod is passed through and welded to one end of a lever 30. The lever 30 extends upward from the end portion 32 of the crank rod and has a hole 31 at the upper end. The adjusting spring 24 is engaged at one end with the flange 28 on the bracket 10 and at the other end with the hole 31 of the lever 30. The end portion 32 of the crank rod extends beyond the lever 30 as shown by 33 in FIG. 7 and is engaged with the slot 27 in the downward extension 26 of the bracket 10. A clip 35 is attached to the outer end of the portion 33 of the end portion 32 of the crank rod to restrict axial movements of the crank rod. The other end portion 32' is inserted into the hole 25 in the flange 8 of the bracket 7.

The adjustment of the hardness can be made in this embodiment as in the previous embodiment. By actuating the handle lever 18, the adjusting member 13 can be rotated about the axis of the pin 14 in, for example, the counter clockwise direction in the plane of FIG. 6 from the "soft" position to the "hard" position. Thus the upper end of the adjusting spring 24 is moved from the position a to the position a'. If the back-up plate 36 is forced rearward under the weight of the passenger, the lever 30 is rotated clockwise about the axis c of the end portion 32 of the crank rod so that the lower end of the spring 24 is moved from the point b to the point b'. Thus, the axis of the spring 24 is shifted away from the axis c producing a resisting moment having an increased moment arm 12.

Figure 8:
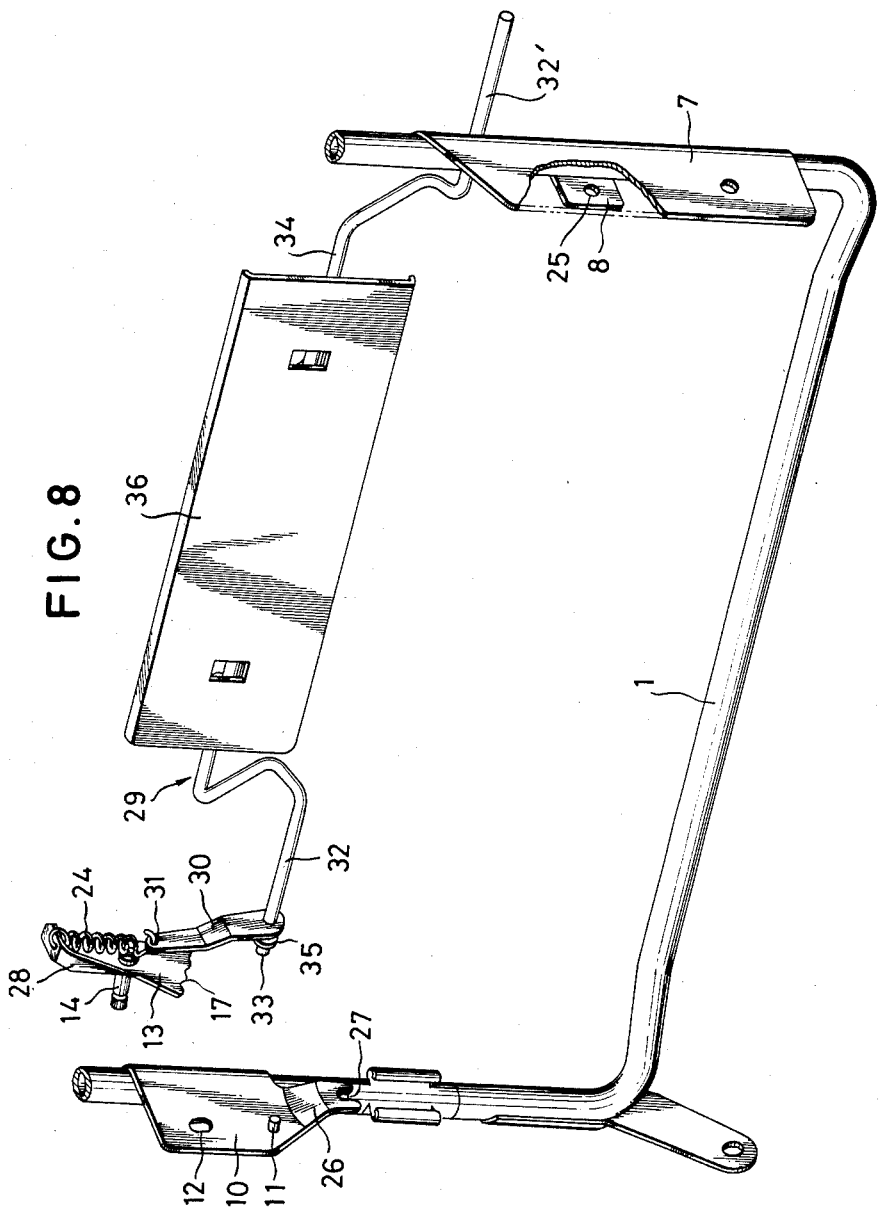
FIG. 8 is a perspective view explaining assembling steps of the structure shown in FIG. 5.

In assembling the mechanism which has just been described, the adjusting spring 24 is attached to the adjusting member 13 and the lever 30 as shown in FIG. 8 and the pin 14 on the adjusting member 13 is then engaged with the slot 12 in the bracket 10. Thereafter, the clip E is fitted to the pin 14 and the end portion 32' is inserted into the hole 25 in the flange 8. The other end portion 32 is then engaged with the downwardly opened slot 27.

According to the structure of the previous embodiment, the adjusting members 13 and 13' are connected together by the connecting rod 16 and the axial movement is restricted either by the clip E on the pin 14 or by the end flange on the pin 14'. In the second embodiment the crank rod is restricted from axial movement by the clip 35 provided on one end portion 32. These arrangements are preferable as compared with and arrangement wherein the adjusting members or the end portions of the crank rod are respectively provided with means for restricting the axial movement, because there will be no problem even if the length of the connecting rod or the crank rod changes due to a manufacturing tolerance. Further, such rod is supported at one end by a hole in the bracket and at the other end by a one-end open slot so that the structure can be assembled without any problem.

Figure 9:
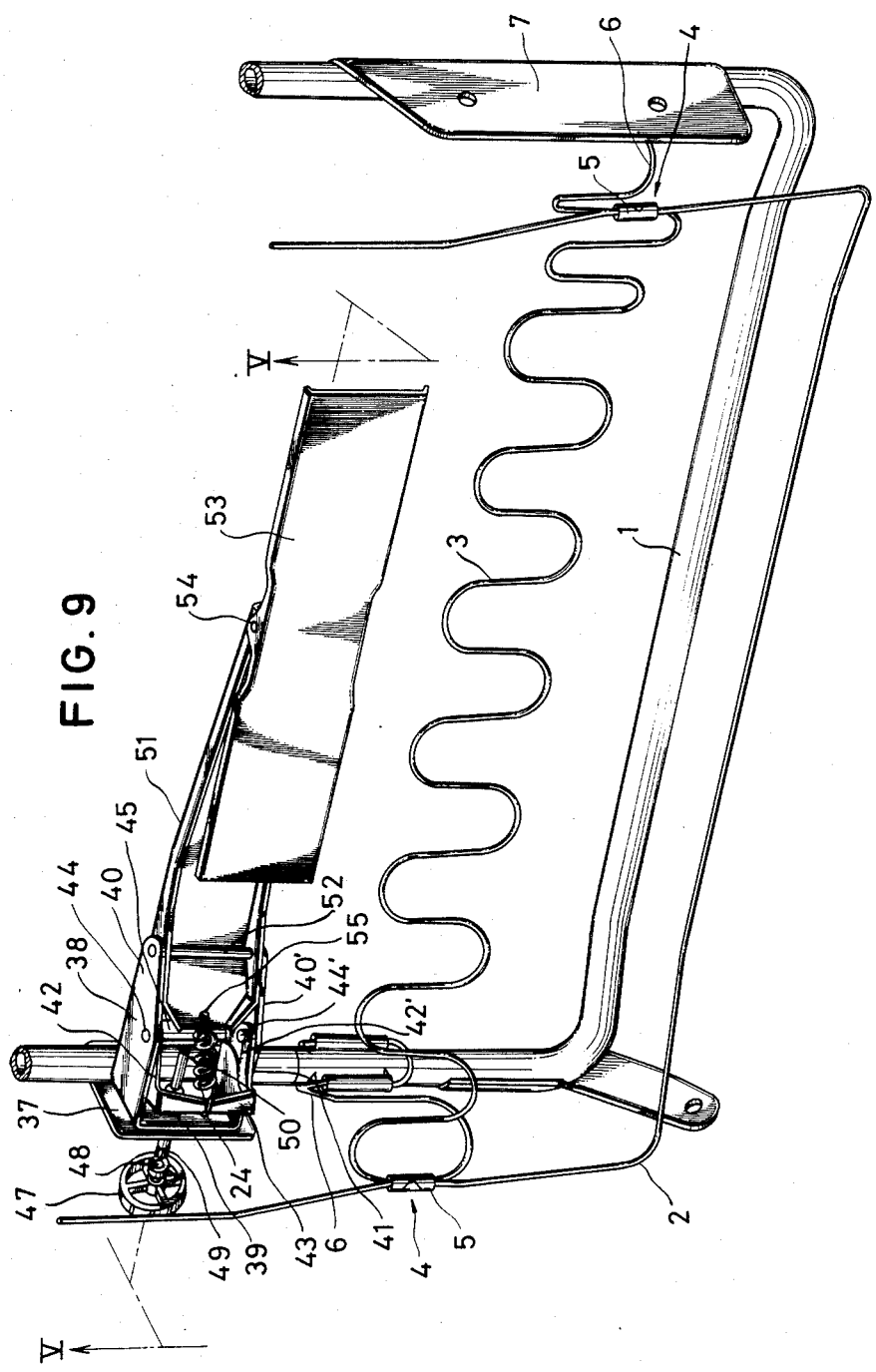
FIG. 9 is a perspective view showing a further embodiment of the present invention.
Figure 10:
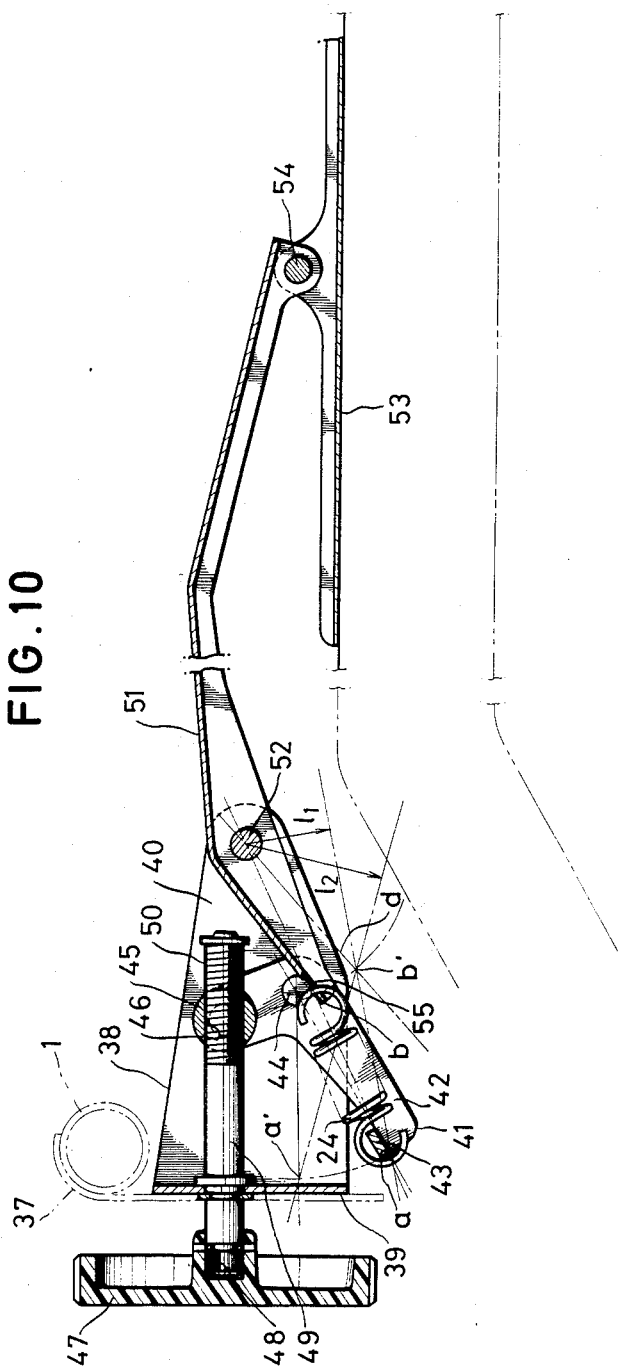
FIG. 10 is a sectional view taken substantially along the line V—V in FIG. 9.

Referring now to FIGS. 9 and 10, there is shown a third embodiment of the present invention which is different from the previous embodiments in that the back-up structure is mounted in a canti-lever fashion. At one side portion of the seat back frame 1, there is attached a bracket 37 which carries a base plate 38 of a substantially U-shaped configuration, which is secured to the bracket 37 at the base 39 of the U-shape. The base plate 38 has a pair of arms 40 and 40' extending perpendicularly from the base 39 and is mounted with the arms extending laterally inward of the seat back frame 1.

The base plate 38 carries an adjusting member 41 which includes a pair of bell crank levers 42 and 42' pivotably carried respectively by the arms 40 and 40' through pins 44 and 44'. The bell crank levers 42 and 42' are each formed at one end integrally with a plate 43. The bell crank levers 42 and 42' rotatably carry at their other ends a shaft 45 which is formed with a diametrically extending internally threaded hole 46. There is provided a handle 47 having a receptacle hole 48 to which an actuating shaft 49 is fitted. The shaft 49 is supported rotatably by the base 39 of the base plate 38 and formed with an externally threaded portion 50 which is engaged with the internally threaded hole 46 in the shaft 45. It will therefore be understood that by rotating the handle 47, it is possible to turn the bell crank levers 42 and 42' about the pins 44 and 44'.

A back-up lever 51 is mounted at an intermediate portion thereof on end portions of the arms 40 and 40' by means of a pin 52. The lever 51 carries at one end a back-up plate 53 which is pivotally mounted on the lever 51 by means of a pin 54. At the other end, the lever 51 is formed with a hole 55 to which an adjusting spring 24 is engaged at one end. The other end of the spring 24 is engaged with the plate 43 of the adjusting member 41.

In FIG. 10, the parts are shown in positions corresponding to the "soft" condition of the adjusting mechanism. When the handle 47 is rotated to rotate the shaft 49, the shaft 45 threadably engaged with the shaft 49 is moved rightward so that the adjusting member 41 is turned clockwise about the pin 44. Thus, one end of the adjusting spring 24 is moved from the position a to the position a'. When a load is incurred on the back-up plate 53 to move it reaward, the back-up lever 51 is turned counter clockwise about the pin 52 so that the other end of the spring 24 is moved from the position b to the position b'. Thus, the moment arm 12 for the spring force about the pin 52 is increased than that 11 in the "soft" position.

Figure 11:
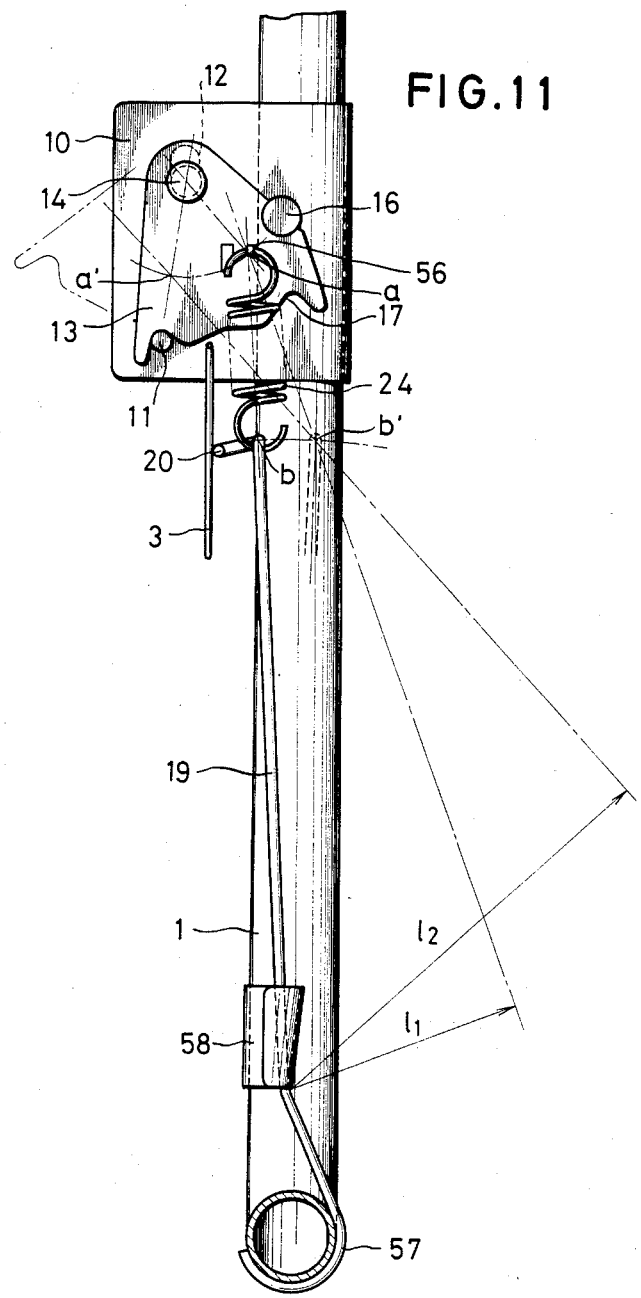
FIG. 11 is a side view showing still further embodiment of the present invention; and, FIG. 12 shows yet further embodiment of the present invention.

FIG. 11 shows a further embodiment which is substantially the same as the first embodiment. In this embodiment, the adjusting member 13 is provided with a hook 56 beneath the pin 14 in lieu of the arm 15 for engagement with the adjusting spring 24. In the first embodiment, the pin 11 engages the lower edge of the adjusting member 13 at the right hand portion, however, in this embodiment, the pin 11 engages the left hand portion. Further, for holding the lower end of the spring 24, a spring 19 is provided as in the first embodiment, however, the spring 19 is engaged with a rotation stopper 58 provided on the seat back frame 1. In this example, the direction of actuation of the handle is opposite to that in the first embodiment. With this embodiment, the resiliency of the spring 19 can be utilized by fixing the lower portion of the spring by means of the stopper 58.

Figure 12:
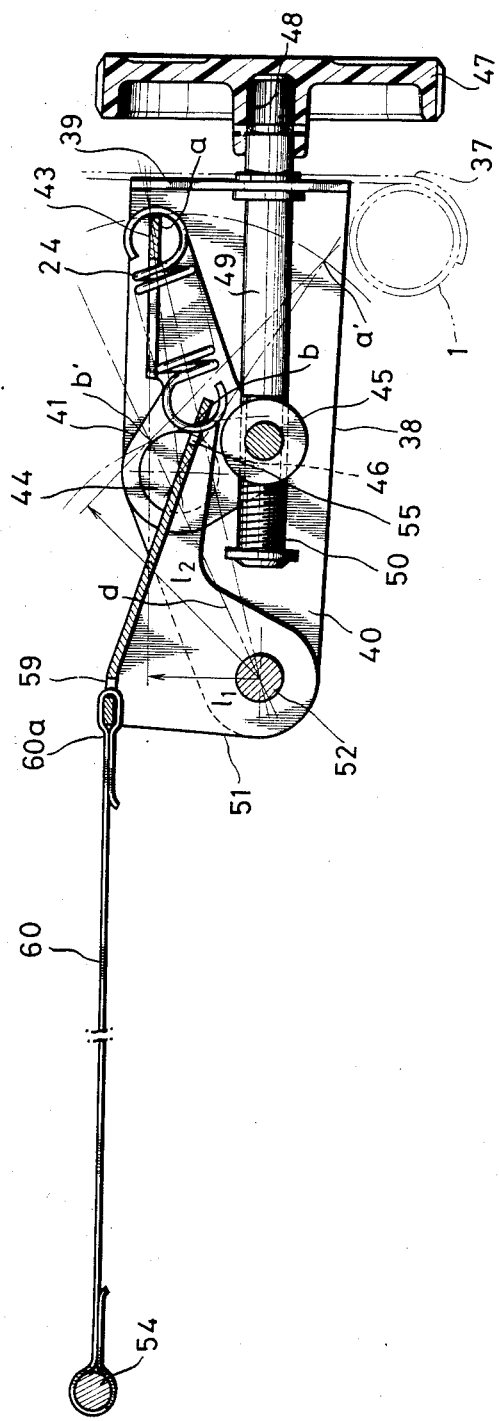

Referring to FIG. 12, there is shown a further embodiment which is similar to the third embodiment. In this embodiment, however, the back-up lever is connected at a slot 59 with one end 60a of a band 60, the other end of the band 60 being connected through a pin 54 with a back-up plate. The operations are the same as those in the third embodiment.

The invention has thus been shown and described with reference to specific embodiments, however, it should be noted that the invention is in no way limited to the details of the illustrated structures but changes and modifications may be made without departing from the scope of the appended claims.

Thus, it is intended that all matter contained in the foregoing description or shown in the accompanying drawings shall be interpreted as illustrative and not in a limiting sense.

We claim:

1. A resilient back-up mechanism for a seat back structure of a vehicle seat for supporting a waist portion of a passenger sitting on the seat, comprising:
    a seat back frame;
    an adjusting member mounted on said seat back frame for pivotable movement;
    actuating means for producing the pivotable movement;
    back-up means mounted pivotably about a pivot point on said seat back frame in a position corresponding to the waist portion of the passenger sitting on the seat;
    adjustable spring means having one end engaged with the adjusting member and the other end engaged with the back-up means to apply a resilient support to the back-up means against a rearward movement, said spring means having an axis of spring force directed along a line spaced by a distance from the pivot point of the back-up means so that a moment is produced by the spring force to resist rearward movement of the back-up means when a load is applied thereto from the passenger, wherein the adjusting member may be swingably moved by the actuating means to change the distance between the pivot point of the back-up means and the axis of the spring force.

2. A resilient back up mechanism in accordance with claim 1 wherein said back-up means includes a spring member having a central portion located at the position corresponding to the waist of the passenger and a pair of leg portions extending downwardly from the opposite ends of the central portion and pivotably connected at lower ends with the seat back frame, said adjustable spring means being engaged with the spring member at a corner between the central portion and the leg portion.

3. A resilient back-up mechanism in accordance with claim 1 wherein said back-up means includes a rod extending transversely between opposite side portions of the seat back frame and having opposite ends rotatably supported by the opposite side portions of the seat back frame, said rod having a radially extending arm engaging said adjustable spring means.

4. A resilient back-up mechanism in accordance with claim 3 wherein one end of said rod is supported by a hole provided in one side portion of the seat back frame, the other end of said rod engaging a one-end open slot in the other side portion of the seat back frame.

5. A resilient back-up mechanism in accordance with claim 1 wherein said back-up means comprises a first member pivotably supported by said seat back frame, said first member having one end connected with said adjustable spring means, the other end of the first member being pivotably connected with a second member which provides a support for the waist of the passenger.

6. A resilient back-up mechanism in accordance with claim 5 wherein said adjusting means comprises a crank lever, said actuating means having means for producing a swinging movement of the crank lever.

7. A resilient back-up mechanism in accordance with claim 6 in which said actuating means further comprises a screw-nut mechanism operatively connected to said adjusting member for moving said adjusting member.

8. A resilient back-up mechanism in accordance with claim 1 further comprising:
    a pair of adjusting members provided at respective sides of the seat back frame, said adjusting members being connected by a connecting rod to swing together;
    a pair of adjusting springs being provided between the respective adjusting members and the back-up means, said adjusting member having mounting pins, one of the pins being rotatably mounted in a hole formed on one side portion of the seat back frame and the other pin being engaged with a one-end open slot on the other side portion of the seat frame.

9. A resilient back-up mechanism for a seat back structure of a vehicle seat for supporting a waist portion of a passenger sitting on the seat, comprising:
    a seat back frame, said seat back frame having opposite side portions, one of the side portions being provided with first bracket means having a mounting hole, the other side portion being provided with second bracket means havng a one-end open mounting slot;
    an adjusting member pivotably mounted on said seat back frame;
    back-up means mounted on said seat back frame in a position corresponding to and for supporting the waist portion of the passenger sitting in the seat;
    pin support means integral with said back-up means, said pin support means engaging said mounting hole in the first bracket means and said mounting slot in the second bracket means for mounting said back-up means on said seat back frame;
    at least one adjustable spring mounted on said adjusting member, said adjustable spring connecting the back-up means with the adjusting member, said adjustable spring applying a resilient support to the back-up means for resisting rearward movement when a load is applied thereto from a passenger, said adjustable spring having an axis of spring force having a direction with respect to said back-up means that may be changed by pivotably moving said adjusting member, whereby pivoting said adjusting member changes the direction of the axis of spring force applied to the back-up means so as to change the amount of resilient support provided to the back-up means by said adjustable spring.

* * * * *